(12) United States Patent
Wardensky

(10) Patent No.: US 8,264,208 B2
(45) Date of Patent: Sep. 11, 2012

(54) SYSTEMS AND METHODS OF CHARGING SUPER-CAPACITORS

(75) Inventor: Luke Lloyd Wardensky, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 579 days.

(21) Appl. No.: 12/340,704

(22) Filed: Dec. 20, 2008

(65) Prior Publication Data

US 2010/0156359 A1      Jun. 24, 2010

(51) Int. Cl.
*H02J 7/00* (2006.01)

(52) U.S. Cl. ........................................ 320/166; 320/167

(58) Field of Classification Search .................. 320/166
See application file for complete search history.

(56) References Cited

U.S. PATENT DOCUMENTS

| | | | |
|---|---|---|---|
| 6,531,853 B2 * | 3/2003 | Umemoto | 323/282 |
| 6,628,107 B1 | 9/2003 | Bang et al. | |
| 6,700,352 B1 | 3/2004 | Elliott et al. | |
| 6,806,679 B2 | 10/2004 | Yang | |
| 6,833,983 B2 | 12/2004 | Nguyen et al. | |
| 2002/0097031 A1 * | 7/2002 | Cook et al. | 323/273 |
| 2006/0017756 A1 * | 1/2006 | Huang | 347/7 |
| 2007/0139018 A1 * | 6/2007 | Mentelos | 320/166 |
| 2007/0279010 A1 * | 12/2007 | Okamura et al. | 320/166 |
| 2009/0009145 A1 * | 1/2009 | Odajima et al. | 320/166 |

* cited by examiner

*Primary Examiner* — Arun Williams

(57) ABSTRACT

Systems and methods for charging a super-capacitor are disclosed. An exemplary method may include outputting a controllable signal, such as a pulse width modulated (PWM) signal, to control a charging circuit. The method may also include determining system voltage. The method may also include reducing a duty cycle of the controllable signal if the system voltage is in regulation, and increasing the duty cycle of the controllable signal if the system voltage is out of regulation to reduce brown-outs during charging of the super-capacitor.

15 Claims, 3 Drawing Sheets

SYSTEMS AND METHODS OF CHARGING SUPER-CAPACITORS

BACKGROUND

Electrode devices are widely used to store electrical energy, including battery cells and capacitors. For a number of reasons "super-capacitors" are gaining popularity in many energy storage applications. The reasons include availability of super-capacitors with high power densities (in both charge and discharge modes), and with energy densities approaching those of conventional rechargeable batteries.

In comparison to conventional capacitors, super-capacitors have high capacitance in relation to their volume and weight. There are two main reasons for these volumetric and weight efficiencies. First, the charge separation layers are very narrow. Their widths are typically on the order of nanometers. Second, the electrodes can be made from a porous material, having a very large effective surface area per unit volume. Because capacitance is directly proportional to the electrode area and inversely proportional to the widths of the charge separation layers, the combined effect of the large effective surface area and narrow charge separation layers a very high capacitance in comparison to conventional capacitors of similar size and weight. High capacitance of super-capacitors allows the capacitors to receive, store, and release a large amount of electrical energy.

Maximizing the charge and discharge rates is important in many applications. In backup battery applications for electronic devices (e.g., computer systems), for example, a capacitor that is used as the energy storage element during a power interruption has to be able to provide high instantaneous power, requiring high power in relation to the size of the super-capacitor.

Efficient and fast charging circuits may lead to unsafe system voltage levels. Super-capacitors act like short circuits when charging starts. If left unprotected, these charging cycles may lead to a "brown-out" where insufficient charge is being provided to the electronics device because the charge is being consumed by the super-capacitor. One way to reduce brown-outs from occurring is to slow the time required to charge the super-capacitor. Typically, a resistor is placed in series to limit the amount of current being drawn by the system. However, the resistor is subject to resistive heating which can reduce charging efficiency. In addition, the super-capacitor also becomes more resistive as the super-capacitor is charged. In a system with a fixed current output (e.g., set by the resistor described above), there is no way to speed the charging cycle.

Other solutions are available which implement a series resistor and a control circuit with an extra voltage regulator dedicated to charging the capacitor. Still other solutions implement a separate battery charger to charge the super capacitor. However, these solutions are complex and expensive to implement.

DETAILED DESCRIPTION

Briefly, systems and methods described herein may be implemented in a circuit for charging super-capacitors quickly and efficiently without drawing the system voltage out of regulation, thus avoiding brown-outs. The circuit may be provided for a backup power supply in an electronics system (e.g., one or more computer server or appliance). In an exemplary embodiment, the circuit includes a controller, a low-pass filter, a switching device such as a P-Channel Field Effect Transistor (PFET), and the capacitor being charged. The controller outputs a controllable signal, such as a pulse width modulation (PWM) signal with an adjustable duty cycle. Adjusting the duty cycle increases and decreases voltage on the gate of the PFET to control the current that is allowed to pass through the PFET to charge the super-capacitor.

According to exemplary embodiments described herein, outputting a controllable signal with an adjustable duty cycle improves operating efficiencies. For example, the controller may decrease the duty cycle to allow more current to flow through the PFET when the system voltage is within regulation. Likewise, the controller may increase the duty cycle to limit the current flowing through the PFET when the system voltage is out of regulation, thereby protecting against brown-outs. The controller may also monitor the voltage of the super-capacitor so that the charger can be started and stopped on demand.

Before continuing, it is noted that the term "super-capacitor" as used herein is defined as a particularly high energy density capacitor (e.g., with capacitance measured in farads, milli-farads, or less) as compared to other capacitor technologies (e.g., with capacitance measured in the thousands of farads or higher). Examples of "super-capacitors" as the term is used herein include ultra-capacitors and electric or electro-chemical double-layer capacitors (EDLC) capacitors, proprietary capacitors such as the Electrical Energy Storage Units (EESU) commercially available from EEStore (Cedar Park, Tex.), as well as high-capacity electrolytic capacitors, and other high energy density capacitors now known or later developed.

Exemplary System

Figure 1:
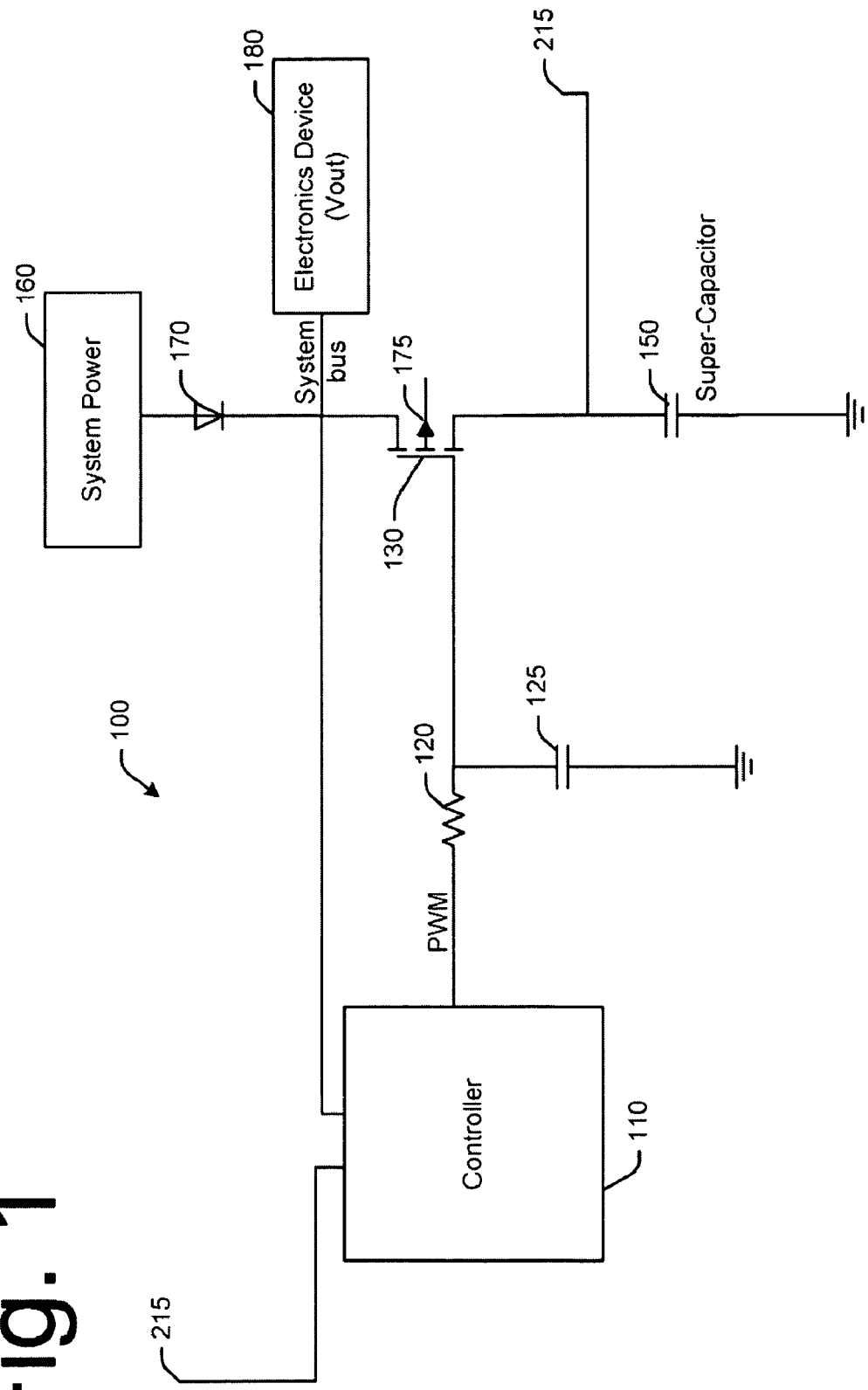
FIG. 1 is a schematic diagram illustrating an exemplary circuit which may be implemented for charging super-capacitors.

FIG. 1 is a schematic diagram illustrating an exemplary circuit 100 which may be implemented for charging super-capacitors. The circuit 100 may include a controller 110, a low-pass filter including resistor 120 and capacitor 125, a switching device 130, and the capacitor 150 being charged. The circuit 100 may receive electrical power from a system power 160.

The system power 160 may be provided by a bridge (not shown) to an AC power source (e.g., an electrical outlet). The bridge provides a rectified AC signal which behaves as a "partial DC" signal. Bridges for providing a rectified AC signal are well known in the electronics arts, and generally operate by "flipping" the negative portion of the AC sine wave so that it is additive with the positive portion of the AC sin wave.

In an exemplary embodiment, the controller 110 is a commercially available processing component (e.g., a microprocessor executing firmware), such as an Atmel AT Mega48 microcontroller. Also in an exemplary embodiment, the switching device 130 may be a commercially available P-Channel Field Effect Transistor (PFET).

During the time when the super-capacitor is supplying backup power, the switching element 130 receives the full current demand of the electronics device 180. Therefore, the switching element 130 (e.g., a PFET) should be selected so that the switching element 130 can handle the current requirements for supplying backup power to the electronics device 180.

In addition, during charging the controllable signal limits the amount of current flowing through the switching element 130. The charging current can be found by using the series resistance, estimated serial resistance of the switching element 130, the charging voltage, and the duty cycle. However, it is desirable for the controller 110 may be implemented to adjust the signal frequency of the controllable signal to use as much current as possible without drawing the system voltage out of regulation. Therefore, the switching element 130 (e.g., a PFET) should be selected so that the switching element 130 can handle the current requirements for charging the super-capacitor 150.

It is noted that controllers and switching elements, such as just described, are well-understood in the electronics arts. The specific implementations called out above are merely illustrative of one type of controller and one type of switching element which may be implemented. Other types of controllers and/or switching elements may also be used, as will be readily understood by those having ordinary skill in the art after becoming familiar with the teachings herein.

Continuing now with a description of the circuit 100, the controller 110 may be configured to output a controllable signal, such as a pulse-width modulation (PWM) signal having an adjustable duty cycle. Although the controllable signal is described herein as being a PWM signal for purposes of illustration, it is noted that the controllable signal is not limited to a PWM signal.

In any event, adjusting, the duty cycle of the controllable signal increases and decreases the voltage on the gate of the switching element 130 to control the amount of current that is allowed to pass through the switching element 130 to the super capacitor.

The controller 110 may also be configured to monitor the system voltage 160 during operation to control current through the switching element 130. When the switching element 130 is activated, current is allowed to flow to the super-capacitor 150 for charging the super-capacitor 150. Accordingly, the super-capacitor 150 can be charged quickly and efficiently when sufficient power is available to operate the electronics device 180 (i.e. the system voltage is "in regulation").

When the switching element 130 is deactivated, current blocked from the super-capacitor 150. Accordingly, the super-capacitor 150 can be does not draw on the system voltage when there is insufficient power available to operate the electronics device 180 to avoid brown-outs (i.e., the system voltage is "out of regulation").

It is noted that any suitable threshold (or thresholds) may be implemented for determining when the system voltage is in regulation, or alternatively when the system voltage is out of regulation. Selecting these thresholds may depend on various design considerations. Exemplary design considerations may include power requirements of the electronics device 180 and/or available power, as well as other load parameters.

The low-pass filter (e.g., resistor 120 and capacitor 125) may have a cut-off frequency less than the PWM frequency to convert the PWM signal into a DC voltage. In an exemplary embodiment, the cut-off frequency of the low-pass filter is about twenty times less than the PWM signal frequency and converts the PWM signal into a smooth DC voltage. Converting the PWM signal to a DC voltage helps reduce "chattering" (i.e., the switching element 130 opening and closing).

The circuit may also include at least two diodes 170 and 175. The diodes 170, 175 may be implemented to avoid extra overhead of "make before break" power switching circuits. That is, the first diode 170 (or system diode) connects system power to the switching device 130 to provide current for charging the super-capacitor 150 and for normal operation of the electronics device 180. When the system power 160 fails, diode 170 keeps the backup voltage from feeding back onto the system bus to the electronics device 180. Accordingly, the diode 170 may be selected such that the diode 170 is capable of handling the current drawn by the backed-up electronics device 180 (i.e., backed-up by super-capacitor 150).

The second diode 175 may be built into the switching device 130. Diode 175 keeps system power 160 from charging the super capacitor 150 when the switching device 130 is inactivated (or "off"), but allows electrical energy stored in the super capacitor 150 to be provided on the system bus to the electronics device 180 whenever the system power 160 drops below the difference in capacitor voltage ($V_{cap}$) of the super-capacitor 150 and the diode voltage ($V_{diode}$) of diode 175 (i.e., $V_{cap}-V_{diode}$).

Before continuing, it is noted that the circuit 100 may be configured at run-time in order to be based on operational data for the circuit. Also in exemplary embodiments, the configuration may be maintained during operation. Accordingly, the circuit is adaptable and may be reconfigured, e.g., based on changes in the run-time environment.

In addition, the exemplary circuit 100 is shown in FIG. 1 as it may be implemented in hard-wired circuitry with a controller executing program code (e.g., firmware). However, it is noted that the circuit may also be implemented in other circuitry (e.g., logic gates) as will be readily apparent to those having ordinary skill in the art after becoming familiar with the teachings shown and described herein.

Figure 2:
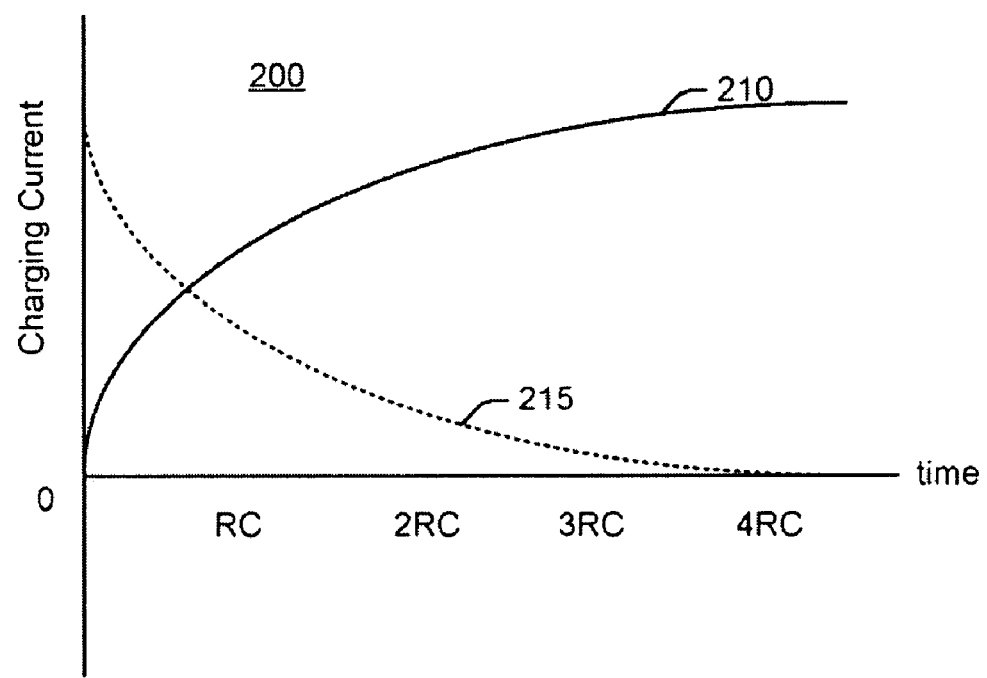
FIG. 2 is a plot showing charging current as a function of time illustrating the charge on a super-capacitor.

In exemplary embodiments, the controller 110 may also be configured as a "health" monitor (e.g., at connections 215) for the super-capacitors to determine if the super-capacitor is charging within a predetermined time, thereby indicating that the super-capacitor is operable. Super-capacitors 150 charge at a rate that is well-known as shown in FIG. 2. FIG. 2 is a plot 200 showing charging current as a function of time illustrating the charge on a super-capacitor. In FIG. 2, the charge on the super-capacitor is shown by plot 210, where the super-capacitor is fully charged at 4RC, and the charging current is shown by plot 215, where the charging current needed to charge the super-capacitor decreases with time.

The charge time for the super-capacitor may be determined as shown in FIG. 2 by using various time constants. In FIG. 2, four time constants are shown (i.e., RC, 2RC, 3RC, and 4RC), where R is the series resistance of the charging circuit and the capacitor's ESR and C is the capacitance including tolerances and derating.

The following equations may be implemented along with the tolerances from the datasheet for the super-capacitor, and suitable derating techniques to determine a reasonable charge time for the super-capacitor.

$$Q = CV_b\left[1 - e^{\frac{-t}{RC}}\right]; \text{ and} \qquad \text{Equation (1)}$$

$$I = \frac{V_b}{R}e^{\frac{-t}{RC}} \qquad \text{Equation (2)}$$

Where:
Q: Charge
C: Capacitance
$V_b$: Voltage

Once the charge time is found, the controller may monitor the actual time to charge the super-capacitor. For example, the controller may flag a super-capacitor if it takes too long to charge (e.g., a shorted capacitor). Or for example, the controller may flag a super-capacitor if charges too fast (e.g., an open capacitor).

It is noted that the systems and methods described herein do not need to be implemented in any particular circuit design. The circuit design described herein with reference to the figures is provided merely as exemplary of one embodiment of a circuit that may be used. It is contemplated that those having ordinary skill in the art, after becoming familiar with the teachings herein, will be able to provide other circuit designs for charging super-capacitors.

Exemplary Operations

Figure 3:
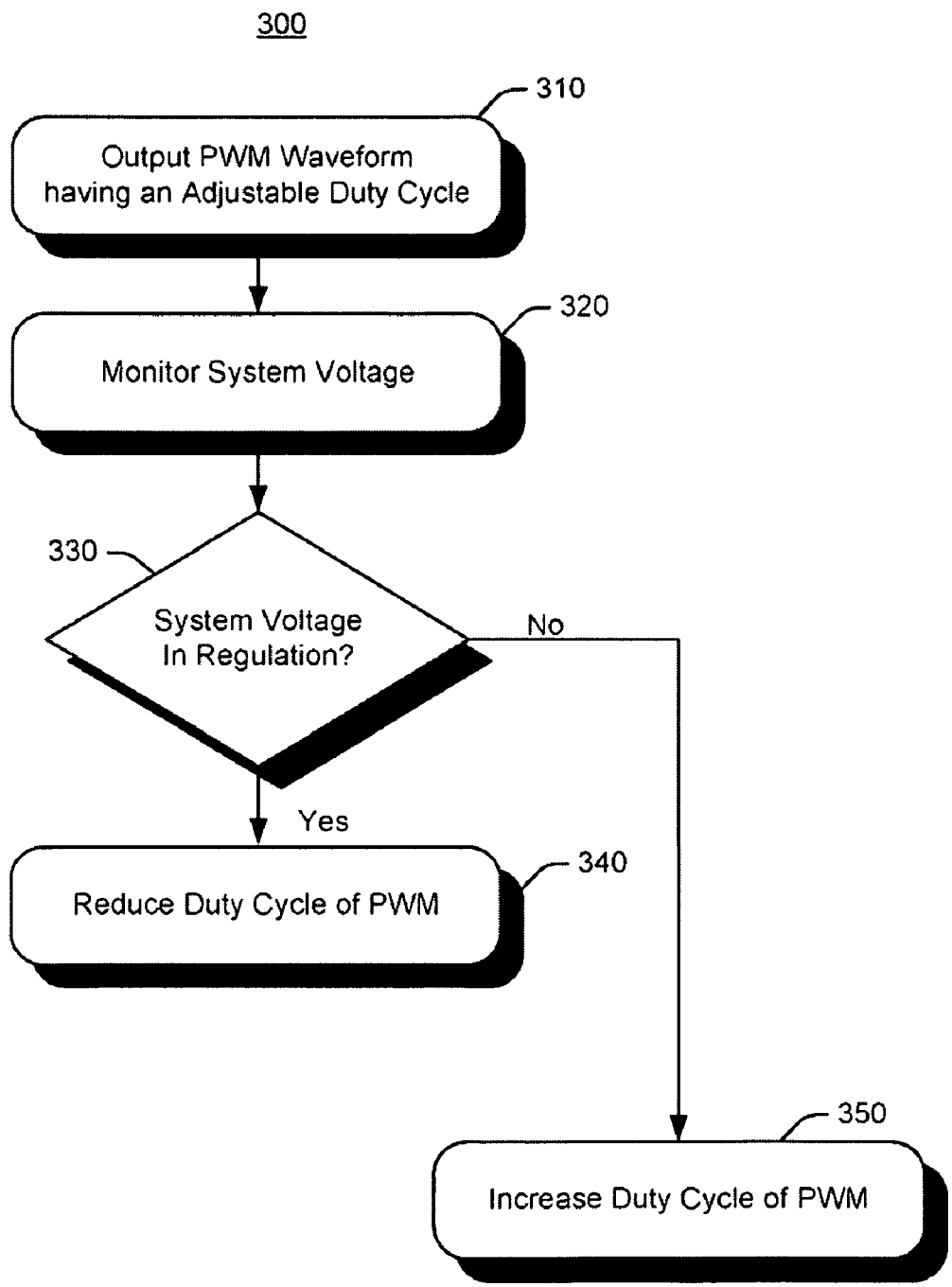
FIG. 3 is a flowchart illustrating exemplary operations for charging super-capacitors.

FIG. 3 is a flowchart illustrating exemplary operations 300 for charging a super-capacitor. In an exemplary embodiment, the components and connections depicted in the figures may be used. It is also contemplated that in other embodiments, operations shown and described herein may be implemented in other circuitry, logic components, and/or control logic such as a processor or processing units.

In operation 310, a controllable signal (e.g., a PWM signal) is output to control a charging circuit. In operation 320, system voltage is measured. In operation 330, a determination is made whether the system voltage (e.g., measured in operation 320) is in regulation. It is noted that one or more threshold may be used to make the determination in operation 330.

If the system voltage is in regulation, a duty cycle of the PWM signal is reduced in operation 340. Alternatively, if the system voltage is out of regulation the duty cycle of the PWM signal may be increased in operation 350 to reduce brown-outs during charging of the super-capacitor.

It is noted that the operations described above with reference to FIG. 3 may be implemented on an ongoing basis. For example, operation 310 may be implemented in an ongoing basis to output a PWM waveform having an adjustable duty cycle, and operations 320 and 330 may be implemented in an ongoing basis to enable starting and stopping charging of the super-capacitor on-demand.

The operations shown and described herein are provided to illustrate exemplary implementations for charging a super-capacitor. Still other operations may also be implemented.

In addition to the specific embodiments explicitly set forth herein, other aspects will be apparent to those skilled in the art from consideration of the specification disclosed herein. It is intended that the specification and illustrated embodiments be considered as examples only, with a true scope and spirit of the following claims.

The invention claimed is:

1. A system for charging a super-capacitor, comprising:
   a power rail providing a system voltage for an electronic device;
   a controller configured to output a controllable signal to control a charging circuit for the super-capacitor, the controller changing a duty cycle of the controllable signal in response to changes in a system voltage; and
   a switching element in the charging circuit, the switching element activating in response to a reduced a duty cycle of the controllable signal to charge the super-capacitor, and the switching element deactivating in response to an increased duty cycle of the controllable signal to reduce brown-outs during charging of the super-capacitor.

2. The system of claim 1, further comprising an electrical device including the charging circuit for charging a back-up power supply to the electronic device.

3. The system of claim 1, wherein the controller reduces the duty cycle of the controllable signal if the system voltage is in regulation, and wherein the controller increases the duty cycle of the controllable signal if the system voltage is out of regulation.

4. The system of claim 1, further comprising a low-pass filter in the charging circuit, the low-pass filter configured to convert the controllable signal into a DC voltage to reduce chatter by the switching element.

5. The system of claim 1, wherein the controller is further configured as a health monitor for the super-capacitor.

6. The system of claim 1, wherein the electronics device receives all current available from the power rail when the switching element is deactivated, and wherein the super-capacitor receives current from the power rail when the switching element is activated.

7. The system of claim 1, wherein the controller starts and stops charging of the super-capacitor on demand in response to changes in the system voltage.

8. The system of claim 1, further comprising at least one diode connecting the switching element during normal operation, the at least one diode maintaining backup voltage from feeding back onto the electronics device when the system voltage fails.

9. The system of claim 1, further comprising at least one diode in the switching element, the at least one diode maintaining the system voltage from charging the super-capacitor when the switching element is inactivated.

10. A method for charging a super-capacitor, comprising:
    outputting a controllable signal to control a charging circuit;
    determining system voltage; and
    reducing a duty cycle of the controllable signal if the system voltage is in regulation, and increasing the duty cycle of the controllable signal if the system voltage is out of regulation to reduce brown-outs during charging of the super-capacitor.

11. The method of claim 10, wherein adjusting the duty cycle of the controllable signal controls current passing through the circuit to the super-capacitor.

12. The method of claim 10, further comprising converting the controllable signal into a DC voltage to reduce chatter on a switching element in the charging circuit.

13. The method of claim 10, wherein increasing the duty cycle of the controllable signal uses all current from a system power rail without drawing the system voltage out of regulation, and wherein decreasing the duty cycle of the controllable signal charges the super-capacitor faster.

14. A system for charging a super-capacitor, comprising:
    means for outputting a pulse width modulated (PWM) signal;
    means for identifying system voltage;
    means for reducing a duty cycle of the PWM signal if the system voltage is in regulation; and
    means for increasing the duty cycle of the PWM signal if the system voltage is out of regulation to reduce brown-outs during charging of the super-capacitor.

15. The system of claim 14, further comprising means for converting the PWM signal into a DC voltage to reduce chatter during charging of the super-capacitor.

* * * * *